United States Patent
Tomochika et al.

(10) Patent No.: US 10,132,307 B2
(45) Date of Patent: Nov. 20, 2018

(54) HYDRAULIC PUMP MALFUNCTION DIAGNOSING DEVICE

(71) Applicants: Kobe Steel, Ltd., Kobe-shi (JP); KOBELCO CONSTRUCTION MACHINERY CO., LTD., Hiroshima-shi (JP)

(72) Inventors: Nobuyuki Tomochika, Kobe (JP); Hideki Yoshihara, Hiroshima (JP)

(73) Assignees: Kobe Steel, Ltd., Kobe-shi (JP); KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 15/507,267

(22) PCT Filed: Aug. 11, 2015

(86) PCT No.: PCT/JP2015/072801
§ 371 (c)(1),
(2) Date: Feb. 28, 2017

(87) PCT Pub. No.: WO2016/035526
PCT Pub. Date: Mar. 10, 2016

(65) Prior Publication Data
US 2017/0284387 A1    Oct. 5, 2017

(30) Foreign Application Priority Data
Sep. 2, 2014    (JP) .................................. 2014-178393

(51) Int. Cl.
*F04B 49/10*    (2006.01)
*F15B 19/00*    (2006.01)
(Continued)

(52) U.S. Cl.
CPC .......... *F04B 49/103* (2013.01); *F15B 19/005* (2013.01); *G01P 5/14* (2013.01);
(Continued)

(58) Field of Classification Search
CPC ................................ G01M 3/28; F04B 49/103
See application file for complete search history.

(56) References Cited

U.S. PATENT DOCUMENTS

2009/0241642 A1* 10/2009 Kyllingstad ............ F04B 51/00
73/40
2012/0057991 A1    3/2012 Rampen et al.
(Continued)

FOREIGN PATENT DOCUMENTS

JP    56-141079 A    11/1981
JP    10-150793 A    6/1998
(Continued)

OTHER PUBLICATIONS

International Search Report dated Oct. 20, 2015 in PCT/JP2015/072801 filed Aug. 11, 2015.

*Primary Examiner* — Jewel V Dowtin
(74) *Attorney, Agent, or Firm* — Oblon, McClelland, Maier & Neustadt, L.L.P.

(57) ABSTRACT

A malfunction diagnosing device that includes pistons arranged in a circumferential direction and discharges oil with rotation in the circumferential direction is provided, including: a pressure sensor for detecting a pressure value of oil discharged from a hydraulic pump in rotation; a speed sensor for detecting a rotation phase of the hydraulic pump at a time when a pressure value of oil is detected by the pressure sensor; a phase calculation part; and a rendering part for rendering a model of a relationship between pressure values of oil detected by the pressure sensor and rotation phases of the hydraulic pump detected by the speed sensor and the phase calculation part to thereby obtain pulsating (Continued)

waveform data. This makes it possible to diagnose a malfunction of the hydraulic pump without influence of a change in a rotation speed of the hydraulic pump.

5 Claims, 8 Drawing Sheets

(51) Int. Cl.
  *G01P 5/14* (2006.01)
  *F04D 15/00* (2006.01)
  *G01P 13/00* (2006.01)

(52) U.S. Cl.
  CPC .. *F04B 2201/1201* (2013.01); *F04D 15/0027* (2013.01); *F04D 15/0088* (2013.01); *G01P 13/00* (2013.01)

(56) References Cited

U.S. PATENT DOCUMENTS

| 2012/0076670 A1* | 3/2012 | Rampen | F04B 7/0076 |
| | | | 417/53 |
| 2012/0315176 A1 | 12/2012 | Ogawa et al. | |

FOREIGN PATENT DOCUMENTS

| JP | 2011-190780 A | 9/2011 |
| JP | 2012-524196 A | 10/2012 |
| JP | 2013-170509 A | 9/2013 |

* cited by examiner

ROTATION PHASE [rad]

FIG.8

ROTATION PHASE [rad]

HYDRAULIC PUMP MALFUNCTION DIAGNOSING DEVICE

TECHNICAL FIELD

The present invention relates to a device for diagnosing a malfunction of a hydraulic pump.

BACKGROUND ART

Patent Literature 1 discloses an abnormality detection device for detecting an abnormality in a hydraulic pump. The abnormality detection device of Patent Literature 1 includes a pressure detection section that detects a pressure of hydraulic fluid flowing out of the hydraulic pump in rotation, and a frequency analysis means that analyzes the pulsation frequency of the pressure of hydraulic fluid flowing out of the hydraulic pump based on pressures detected by the pressure detection section. The frequency analysis means analyzes the pulsation frequency of the pressure of hydraulic fluid flowing out of the hydraulic pump along the time axis. The abnormality detection device of Patent Literature 1 uses a result of the pulsation frequency analysis performed by the frequency analysis means to extract a waveform component of the rotation frequency of the hydraulic pump and determine whether the extracted component of the rotation frequency is a normal value or not, to thereby determine whether an abnormality occurs in the hydraulic pump.

As mentioned above, in the abnormality detection device of Patent Literature 1, the frequency analysis means analyzes the pulsation frequency of the pressure of hydraulic fluid flowing out of the hydraulic pump along the time axis, and a result of the analysis is used to determine whether an abnormality occurs in the hydraulic pump.

However, the pressure pulsation of hydraulic fluid changes depending on the rotation phase of the hydraulic pump. Therefore, there is a possibility that, in the abnormality detection device of Patent Literature 1, occurrence of an abnormality in the hydraulic pump cannot be accurately detected. When the pressure pulsation frequency of hydraulic fluid is analyzed along the time axis, the rotation speed of the hydraulic pump at the time of detection of a hydraulic fluid pressure by the pressure detection section needs to be always constant to maintain a constant relationship between pressure pulsation of hydraulic fluid and time. In other words, in the abnormality detection device of Patent Literature 1, the result of pulsation frequency analysis by the frequency analysis means changes according to the change in the rotation speed of the hydraulic pump and, therefore, there is a possibility that occurrence of an abnormality in the hydraulic pump cannot be accurately detected.

CITATION LIST

Patent Literature

Patent Literature 1: Japanese Unexamined Patent Publication No. 2013-170509

SUMMARY OF INVENTION

The present invention aims to provide a malfunction diagnosing device capable of diagnosing a malfunction of a hydraulic pump without being affected by a variation in the rotation speed of the hydraulic pump.

The present invention is a device for diagnosing a malfunction of a hydraulic pump that includes a plurality of pistons arranged in a circumferential direction and discharges liquid with rotation in the circumferential direction, comprising: a pressure detection section for detecting a pressure value of liquid discharged from the hydraulic pump in rotation; a rotation phase detection section for detecting a rotation phase of the hydraulic pump at the time when a pressure value of liquid is detected by the pressure detection section; and a rendering section for rendering a model of a relationship between pressure values of liquid detected by the pressure detection section and rotation phases of the hydraulic pump detected by the rotation phase detection section to thereby obtain pulsating waveform data.

DESCRIPTION OF EMBODIMENTS

Hereinafter, an embodiment of the present invention will be described with reference to the accompanying drawings. It should be noted that the following embodiment illustrates some examples of the invention, and not delimit the protection scope of the invention.

Further, it should be noted that the drawings referred to hereinafter show, for the purpose of explanation, simplified essential portions of a configuration according to the embodiment of the present invention that are necessary for explaining the embodiment. Therefore, the malfunction diagnosing device for a hydraulic pump according to the present invention may include any configuration elements not shown in the drawings referred to in the present specification.

Figure 1:
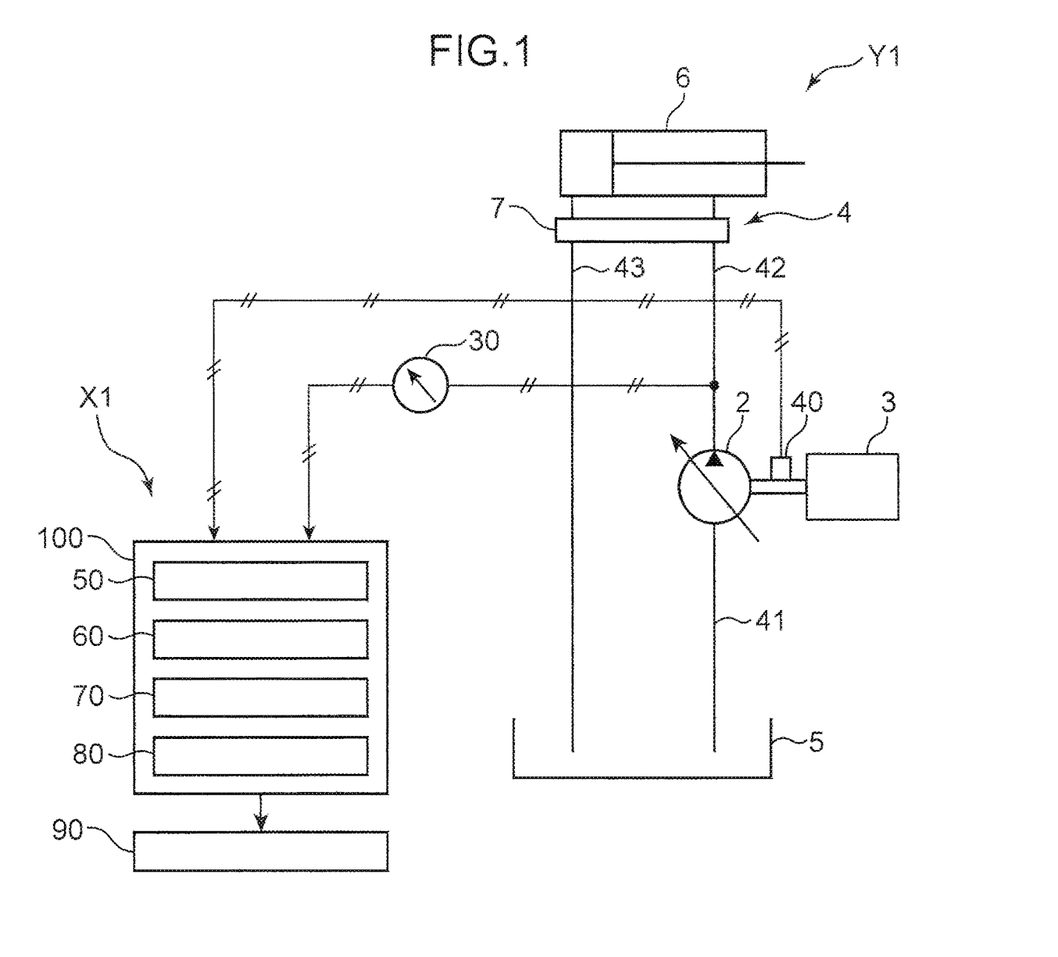
FIG. 1 is a schematic configuration view showing a malfunction diagnosing device for a hydraulic pump according to an embodiment.

FIG. 1 shows a malfunction diagnosing device X1 for a hydraulic pump according to the embodiment. The malfunction diagnosing device X1 is applied for malfunction diagnosis of a hydraulic pump 2 included in a hydraulic circuit Y1.

The hydraulic circuit Y1 is mounted on a construction machine such as a hydraulic excavator. The hydraulic circuit Y1 has a role to actuate a configuration member of the construction machine by hydraulic fluid. The hydraulic circuit Y1 includes the hydraulic pump 2, a driving source 3, first to third hydraulic tubes 41 to 43, a hydraulic cylinder 6, and a control valve 7. The hydraulic pump 2 discharges hydraulic fluid. The driving source 3 drives the hydraulic pump 2. The driving source 3 is in the form of an engine, for example. The first to third hydraulic tubes 41 to 43 constitute a circulation passage of hydraulic fluid. An oil tank 5 stores hydraulic fluid. The hydraulic cylinder 6 expands and contracts upon receipt of hydraulic fluid.

The hydraulic pump 2 has a role to discharge hydraulic fluid to the hydraulic cylinder 6. Specifically, the hydraulic pump 2 is connected to the oil tank 5 via the first hydraulic tube 41. Further, the hydraulic pump 2 is connected to the hydraulic cylinder 6 via the second hydraulic tube 42. Further, the hydraulic pump 2 is connected to an output shaft of the driving source 3 and driven by the driving source 3.

Hydraulic fluid sucked in the hydraulic pump 2 from the oil tank 5 through the first hydraulic tube 41 is discharged from the hydraulic pump 2 driven by the driving source 3 to the second hydraulic tube 42. Thereafter, the hydraulic fluid discharged from the hydraulic pump 2 to the second hydraulic tube 42 is supplied to the hydraulic cylinder 6 via the control valve 7.

Figure 2:
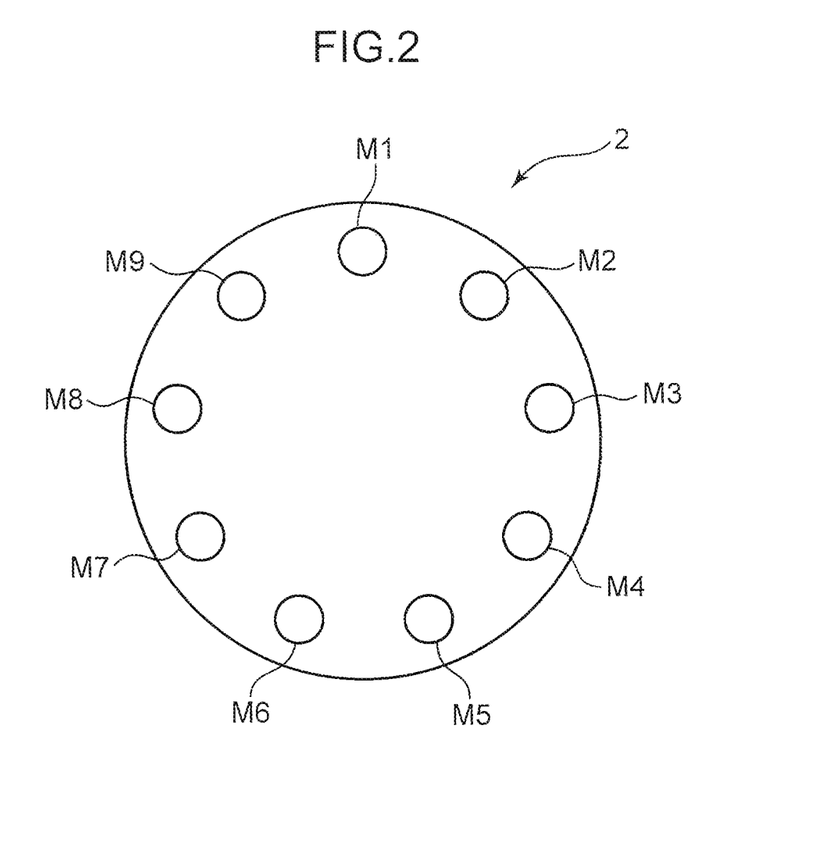
FIG. 2 is a schematic front view showing a hydraulic pump according to the embodiment.

The hydraulic pump 2 is a piston type pump. The hydraulic pump 2 includes nine pistons M1 to M9 as shown in FIG. 2. The pistons M1 to M9 are arranged at regular intervals in a circumferential direction of the hydraulic pump 2. The hydraulic pump 2 rotates in the circumferential direction in accordance with a driving signal from the driving source 3. In the circumferential rotation of the hydraulic pump 2, the pistons M1 to M9 successively operate to discharge hydraulic fluid from the hydraulic pump 2.

It should be noted that, in the present embodiment, the hydraulic pump 2 includes the nine pistons M1 to M9, but any number of pistons may be included in the hydraulic pump 2. The number of pistons may be appropriately changed according to the use mode of the hydraulic pump 2.

The hydraulic cylinder 6 has a role to actuate a configuration member of a construction machine, for example. The hydraulic cylinder 6 includes a piston portion and a cylinder portion. The hydraulic cylinder 6 is connected to the second hydraulic tube 42 and the third hydraulic tube 43 via the control valve 7. When hydraulic fluid is supplied to the hydraulic cylinder 6 from the second hydraulic tube 42, the hydraulic fluid is fed to the oil tank 5 via the control valve 7 and the third hydraulic tube 43.

Now, a configuration of the malfunction diagnosing device X1 according to the embodiment will be described with reference to FIG. 1.

The malfunction diagnosing device X1 includes a pressure sensor 30, a speed sensor 40, a calculation section 100, and a determination section 90. The pressure sensor 30 detects the pressure value of hydraulic fluid. The speed sensor 4 detects the rotation speed of the hydraulic pump 2. The calculation section 100 performs various calculations based on values detected by the sensors 30 and 40. The determination section 90 performs malfunction determination based on a calculation result of the calculation section.

The pressure sensor 30 corresponds to a pressure detection section of the present invention. The pressure sensor 30 has a role to detect the pressure value of hydraulic fluid discharged by the hydraulic pump 2. The pressure sensor 30 is connected to the second hydraulic tube 42 located downstream of the hydraulic pump 2 in the circulation passage of hydraulic fluid, and detects the pressure value of hydraulic fluid in the second hydraulic tube 42. The pressure sensor 30 sends a detected pressure value of hydraulic fluid to the calculation section 100.

The speed sensor 40 has a role to detect the rotation speed of the hydraulic pump 2. The speed sensor 40 is connected, for example, to the joint between the hydraulic pump 2 and the driving source 3 for rotating the hydraulic pump 2. The speed sensor 40 sends a detected rotation speed of the hydraulic pump 2 to the calculation section 100.

The calculation section 100 has a role to perform various calculations based on a pressure value of hydraulic fluid detected by the pressure sensor 30 and a rotation speed of the hydraulic pump 2 detected by the speed sensor 40 for diagnosing a malfunction of the hydraulic pump 2. The calculation section 100 includes a CPU, ROM, RAM, EEPROM or the like, for example.

The calculation section 100 functionally includes a phase calculation part 50, a rendering part 60, a separation part 70, and a feature amount calculation part 80.

The phase calculation part 50 calculates the rotation phase of the hydraulic pump 2 at the time when the pressure sensor 30 detects a pressure value. The phase calculation part 50 receives a pressure value detection signal from the pressure sensor 30 and rotation speed information of the hydraulic pump 2 from the speed sensor 40. Upon receipt of the pressure value detection signal from the pressure sensor 30, the phase calculation section 50 adds rotation speeds of the hydraulic pump 2 detected before the receipt of the detection signal and multiplies the integrated value by a predetermined correction factor. In this manner, the rotation phase of the hydraulic pump 2 at the time when the pressure sensor 30 detects a pressure value is calculated.

In the present embodiment, the rotation phase of the hydraulic pump 2 is obtained by the speed sensor 40 and the phase calculation part 50 as described, and therefore, the speed sensor 40 and the phase calculation part 50 correspond to a rotation phase detection section of the present invention. Alternatively, a rotation phase sensor for directly detecting the rotation phase of the hydraulic pump 2 at the time when the pressure sensor 30 detects a pressure value may be provided in place of the speed sensor 40 and the rotation phase calculation part 50.

The rendering part 60 corresponds to a rendering section of the present invention. The rendering part 60 obtains a relationship between pressure values detected by the pressure sensor 30 and rotation phases of the hydraulic pump 2 calculated by the phase calculation part 50 as described later, the rotation phase being detected at the time when a pressure value is detected, and renders pulsating waveform data in which a frequency is defined with reference to one rotation of the hydraulic pump 2.

The separation part 70 corresponds to a separation section of the present invention. The separation part 70 separates pulsating waveform data rendered by the rendering part 60 into a waveform component common among the pistons M1 to M9 and waveform components respectively inherent to the pistons M1 to M9. It should be noted that the separation part 70 may be configured to separate only the waveform components respectively inherent to the pistons M1 to M9 from the pulsating waveform data rendered by the rendering section 60.

The feature amount calculation part 80 calculates, based on a waveform component inherent to each of the pistons M1 to M9 separated from pulsating waveform data by the separation part 70, the feature amount of the inherent waveform component.

The functions corresponding to the phase calculation part 50, the rendering part 60, the separation part 70, and the feature amount calculation part 80 may be realized by software or by hardware. Further, the functions corresponding to the phase calculation part 50, the rendering part 60, the separation part 70, and the feature amount calculation part 80 may be realized by individual functional components or by a common functional component.

The determination section 90 has a role to determine the presence/absence of a malfunction of the hydraulic pump 2 based on a feature amount calculated by the feature amount calculation part 80. Specifically, the determination section 90 determines the presence/absence of a malfunction of the hydraulic pump 2 by comparing a feature amount sent from the feature amount calculation part 80 with a predetermined threshold value. The determination section 90 includes, similarly to the calculation section 100, a CPU, ROM, RAM, EEPROM or the like. In the present embodiment, the calculation section 100 and the determination section 90 are shown in separate blocks in FIG. 1, but the determination section may be realized by a functional component common with the calculation section 100.

Here, the operational steps of the malfunction diagnosing device X1 will be described in detail with reference to FIG. 3.

Upon start of driving of the hydraulic pump 2 by the driving source 3, hydraulic fluid is discharged from the hydraulic pump 2 to the second hydraulic tube 42 according to rotation of the hydraulic pump 2. The pressure sensor 30 detects a pressure value of hydraulic fluid discharged from the hydraulic pump 2 to the second hydraulic tube 42 (Op1), and sends information about the pressure value to the calculation section 100. The speed sensor 40 chronologically detects rotation speeds of the hydraulic pump 2 after the start of driving of the hydraulic pump 2 by the driving source 3 (Op2) and send information about the rotation speeds to the calculation section 100. Thereafter, the phase calculation part 50 adds all rotation speeds detected before the detection of the pressure value of hydraulic fluid by the pressure sensor 30, and multiplies the integrated value by a predetermined correction factor. In this manner, the phase calculation part 50 calculates the rotation phase of the hydraulic pump 2 at the time when the pressure sensor 30 detects the pressure value (Op3). A method for calculating the correction factor will be described later.

Figure 4:
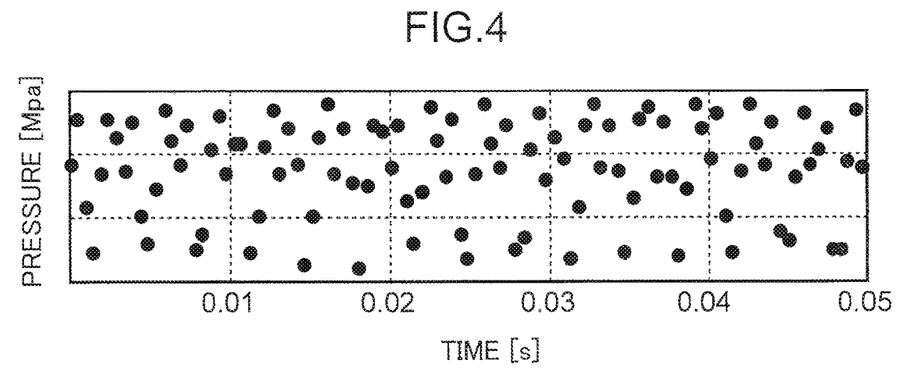
FIG. 4 is a graph in which plural points corresponding to pressure values of hydraulic fluid detected by a pressure sensor are plotted on a time axis.

As shown in FIG. 4, the pressure sensor 30 detects the pressure value of hydraulic fluid discharged from the hydraulic pump 2 to the second hydraulic tube 42 at a predetermined sampling interval. Here, when the number of sampling times of the pressure value by the pressure sensor 30 is N, the following data is obtained, as a result of the above-described operational steps Op1 to Op3, as chronological data including pressure values at the N time points and rotation phases respectively corresponding to the pressure values.

$$\Phi = \begin{bmatrix} \varphi(1) \\ \varphi(2) \\ \vdots \\ \varphi(N) \end{bmatrix}, \quad \text{[Formula 1]}$$

$$P = \begin{bmatrix} p(1) \\ p(2) \\ \vdots \\ p(N) \end{bmatrix},$$

$\varphi(k)$: Rotation phase, $p(1)$: Pressure value

It should be noted that, in the present embodiment, the hydraulic circuit Y1 includes the single hydraulic pump 2. However, when the hydraulic circuit Y1 includes a plurality of hydraulic pumps, the detections of a pressure value and a rotation speed by the sensors 30 and 40 are preferred to be performed individually for each of the plurality of hydraulic pumps. Specifically, when the detections of a pressure value and a rotation speed are performed for one of the plurality of hydraulic pumps, the other hydraulic pumps are preferred to require no load.

The rendering part 60 renders a model of a relationship between pressure values of hydraulic fluid discharged from the hydraulic pump 2 and rotation phases of the hydraulic pump 2 based on the chronological data (Op4).

Figure 5:
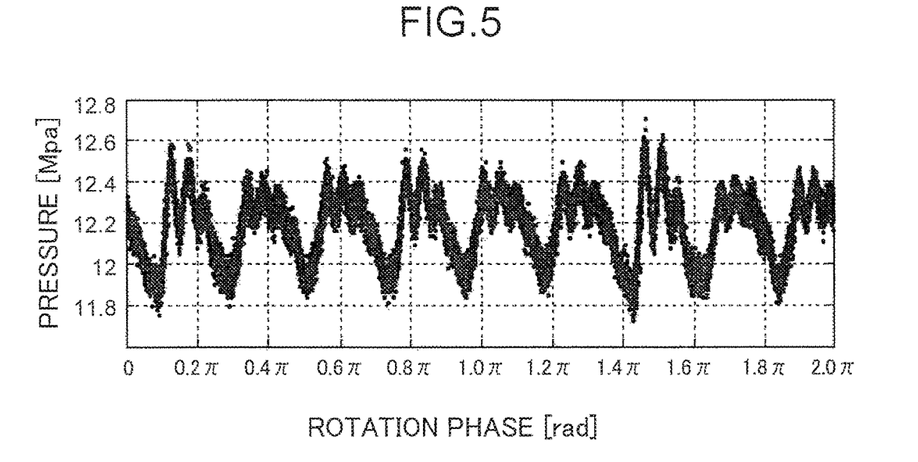
FIG. 5 is a graph in which a relationship between pressure values of hydraulic fluid and rotation phases of the hydraulic pump is mapped in a space in which a frequency is defined with reference to one rotation of the hydraulic pump, the relationship being obtained by superimposing detections for each rotation of the hydraulic pump on one another at specific phases.

Specifically, the rendering part 60 first superimposes detections for each rotation of the hydraulic pump 2 on one another at specific phases during the n-times detections of pressure values by the pressure sensor 30, to thereby map the points shown in FIG. 4 in a space in which a frequency is defined with reference to one rotation of the hydraulic pump 2. FIG. 5 shows a graph in which the chronological data is mapped in the space in which a frequency is defined with reference to one rotation of the hydraulic pump 2 in this manner.

The rendering part 60 subsequently renders a model of the chronological data mapped in the space in which a frequency is defined with reference to one rotation of the hydraulic pump 2, by superimposing waveforms, the number of which is whole number times, i.e., L times, the frequency, the whole number being the number of rotations of the hydraulic pump, on one another. Specifically, the rendering part 60 renders a model of the chronological data mapped in the space in which a frequency is defined with reference to one rotation of the hydraulic pump 2 by using the following model formula.

$$\begin{bmatrix} p(1) \\ p(2) \\ \vdots \\ p(N) \end{bmatrix} = \sum_{j=1}^{L} \left( a_j \cdot \begin{bmatrix} \cos(j\varphi(1)) \\ \cos(j\varphi(2)) \\ \vdots \\ \cos(j\varphi(N)) \end{bmatrix} + b_j \cdot \begin{bmatrix} \sin(j\varphi(1)) \\ \sin(j\varphi(2)) \\ \vdots \\ \sin(j\varphi(N)) \end{bmatrix} \right) + c \cdot \begin{bmatrix} 1 \\ 1 \\ \vdots \\ 1 \end{bmatrix} \quad \text{[Formula 2]}$$

When the number of pistons included in the hydraulic pump 2 is M, the value of L in the above model formula is set to between about (M×5) and (M×10), for example. In the present embodiment, the hydraulic pump 2 includes the nine pistons M1 to M9, and therefore, the value of L is set to between about 45 and 90. When it is possible to accurately render a model of the relationship between pressure values and rotation phases, the value of L may be set to a smaller value than the above-mentioned values. In addition, when the number of sampling times of the pressure value N is sufficiently great, the value of L may be set to a greater value than the above-mentioned values.

The values of coefficients in the above model formula can be obtained by applying the chronological data to the following formula.

[Formula 3]
$$\Theta = [\begin{matrix} a_1 & b_1 & a_2 & b_2 & \ldots & a_L & b_L & c \end{matrix}]^T = (X^T X)^{-1} X^T P$$

$$X = \begin{bmatrix} \cos(\varphi(1)) & \sin(\varphi(1)) & \cos(2\varphi(1)) & \sin(2\varphi(1)) & \ldots & \cos(L\varphi(1)) & \sin(L\varphi(1)) & 1 \\ \cos(\varphi(2)) & \sin(\varphi(2)) & \cos(2\varphi(2)) & \sin(2\varphi(2)) & \ldots & \cos(L\varphi(2)) & \sin(L\varphi(2)) & 1 \\ \vdots & \vdots & \vdots & \vdots & \ddots & \vdots & \vdots & \vdots \\ \cos(\varphi(N)) & \sin(\varphi(N)) & \cos(2\varphi(N)) & \sin(2\varphi(N)) & \ldots & \cos(L\varphi(N)) & \sin(L\varphi(N)) & 1 \end{bmatrix}$$

By applying the coefficients obtained by the above formula to the model formula, the following formula representing the pulsating waveform data can be derived.

[Formula 4]
$$p(\varphi) = \sum_{j=1}^{L} (a_j \cdot \cos(j\varphi) + b_j \cdot \sin(j\varphi)) + c$$

In this manner, the rendering part 60 renders, using the model formula, a model of the chronological data mapped in the space in which a frequency is defined with reference to one rotation of the hydraulic pump 2. Consequently, the pulsating waveform data is calculated.

Figure 6:
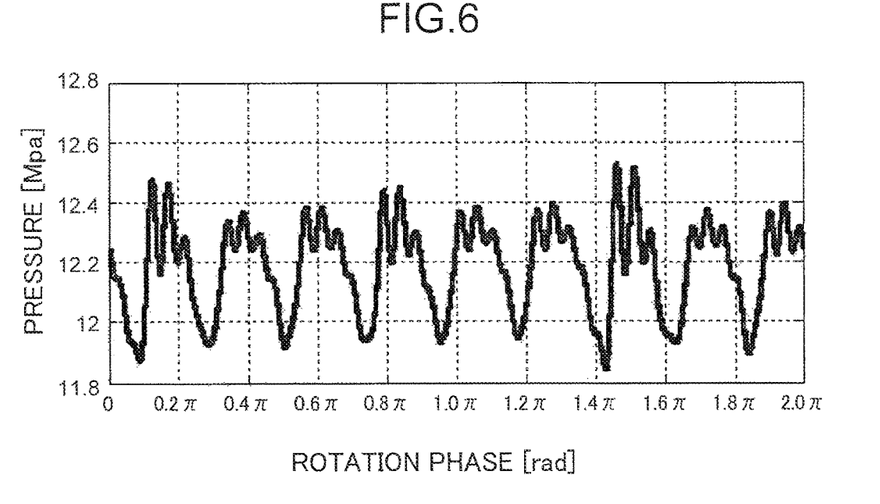
FIG. 6 is a graph obtained by modelling the graph shown in FIG. 5 by superimposing waveforms, the number of which is whole number times the frequency, the whole number being the number of rotations of the hydraulic pump, on one another.

FIG. 6 shows a graph of the pulsating waveform data. The graph shown in FIG. 6 includes nine peaks of pulsation in one rotation of the hydraulic pump 2. This is because the hydraulic pump 2 includes the nine pistons M1 to M9. In the present embodiment, the nine peaks of pulsation correspond to the pistons M1 to M9 in the order of increasing phase.

In the present embodiment, the rendering part 60 transforms the graph shown in FIG. 4 into the graph shown in FIG. 5, and then renders the graph shown in FIG. 6 based on the graph shown in FIG. 5. Alternatively, the graph shown in FIG. 6 may be directly rendered based on the graph shown in FIG. 4.

Here, the predetermined correction factor to be multiplied by the integrated value of rotation speeds of the hydraulic pump 2 in the phase calculation part 50 can be obtained in the following manner, for example. First, the coefficients Θ in the model formula are calculated, using the rotation phase Φ and the pressure value P. Thereafter, calculated values p (φ) obtained by the above formula representing the pulsating waveform data are compared with actual measured values P to find a correction factor that yields a minimum error in the rendering of the model by an optimization calculation. The error in the rendering can be considered as the sum of squares of each error between a calculated value p (φ) and the corresponding measured value P. The method such as PSO may be used in the optimization calculation. Alternatively, a correction factor that yields a minimum error in the rendering may be found from allotted discrete numbers from 0.99 to 1.01 in a unit of 0.00001, and used as an optimal solution.

Thereafter, the separation part 70 separates the pulsating waveform data into a waveform component common among the pistons M1 to M9 and waveform components respectively inherent to the pistons M1 to M9.

Specifically, the separation part 70 separates the pulsating waveform data rendered by the rendering part 60 into the following two formulas.

[Formula 5]
$$p_C(\varphi) = \sum_{j=1}^{L} (\hat{a}_j \cdot \cos(j\varphi) + \hat{b}_j \cdot \sin(j\varphi)) + c \quad \text{A}$$

[Formula 6]
$$p_I(\varphi) = \sum_{j=1}^{L} (\tilde{a}_j \cdot \cos(j\varphi) + \tilde{b}_j \cdot \sin(j\varphi)) \quad \text{B}$$

Formula A represents the waveform component common among the pistons M1 to M9. Formula B represents the waveform component inherent to each of the pistons M1 to M9.

The coefficients in Formula A are calculated separately based on the following conditions.

[Formula 7]
$$\hat{a}_j = \begin{cases} 0 & (\text{when } j \text{ is a multiple of } M) \\ a_j & (\text{when } j \text{ is not a multiple of } M) \end{cases},$$
$$\hat{b}_j = \begin{cases} b_j & (\text{when } j \text{ is a multiple of } M) \\ 0 & (\text{when } j \text{ is not a multiple of } M) \end{cases}$$

The coefficients in Formula B are calculated separately based on the following conditions.

[Formula 8]
$$\tilde{a}_j = \begin{cases} 0 & (\text{when } j \text{ is a multiple of } M) \\ a_j & (\text{when } j \text{ is not a multiple of } M) \end{cases},$$
$$\tilde{b}_j = \begin{cases} b_j & (\text{when } j \text{ is a multiple of } M) \\ 0 & (\text{when } j \text{ is not a multiple of } M) \end{cases}$$

The above-mentioned value of M corresponds to the number of pistons M1 to M9 included in the hydraulic pump 2. In the present embodiment, the hydraulic pump 2 includes the nine pistons M1 to M9 and therefore, M=9. In other words, the separation part 70 separates the pulsating waveform data rendered by the rendering part 60 into waveform components concerning the M1 to M9 frequencies and the other waveform components to thereby extract the waveform component common among the pistons M1 to M9 and the waveform component inherent to each of the pistons M1 to M9.

Figure 7:
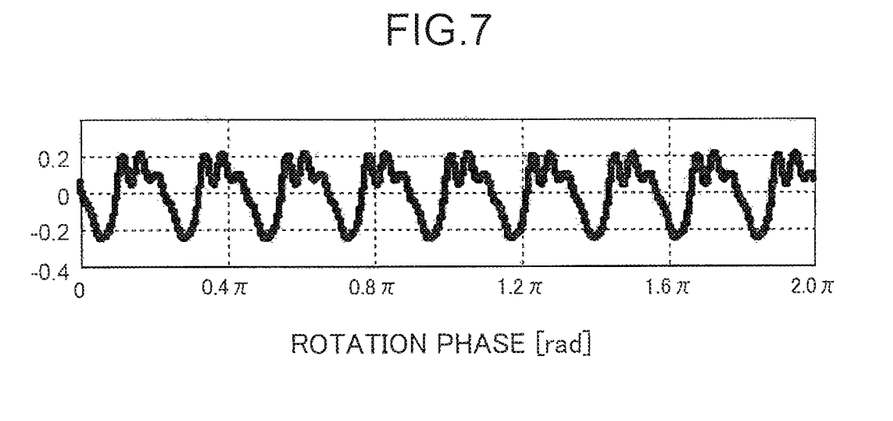
FIG. 7 is a graph obtained by separating a waveform component common among nine pistons from the modelled graph shown in FIG. 6.
Figure 8:
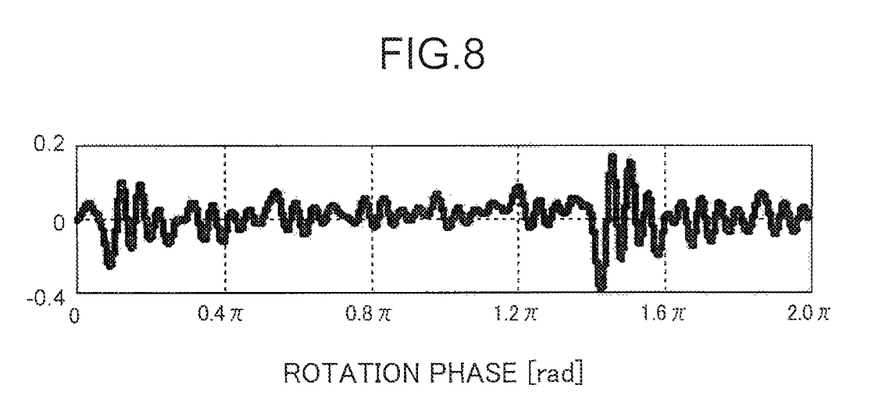
FIG. 8 is a graph obtained by separating a waveform component inherent to each of the nine pistons from the modelled graph shown in FIG. 6.

Here, among the waveform components separated from the pulsating waveform data, the waveform component common among the pistons M1 to M9 is shown in the graph of FIG. 7 and the waveform components respectively inherent to the pistons M1 to M9 are shown in the graph of FIG. 8. The graph of FIG. 7 shows the waveform component common among the pistons M1 to M9 that includes nine peaks of pulsation having the same amplitude in each rotation of the hydraulic pump 2. The graph of FIG. 8 shows the waveform components respectively inherent to the pistons M1 to M9.

In a normal condition in which the pistons M1 to M9 move in the same manner, the pulsating waveform data only include a waveform component common among the pistons M1 to M9. Therefore, when the pistons M1 to M9 are in the normal condition, only a small difference due to a variation in manufacturing appears in the pulsating waveform of the pistons M1 to M9. Therefore, the waveform component inherent to each of the pistons M1 to M9 should be a value close to zero, regardless of the rotation phase of the pump 2 from 0 to $2.0\pi$.

In contrast, in the graph of FIG. 8 showing the waveform components respectively inherent to the pistons M1 to M9, a medium change in the waveform is seen in the region of a rotation phase corresponding to the first of the nine pulsation peaks in the increasing order of rotation phase shown in FIG. 7. The medium waveform change is caused by the piston M1. Further, in the graph of FIG. 8 showing the waveform components respectively inherent to the pistons M1 to M9, a great change in the waveform is seen in the region of a rotation phase corresponding to the seventh of the nine pulsation peaks in the increasing order of rotation phase shown in FIG. 7. This great waveform change is caused by the piston M7.

Thereafter, the feature amount calculation part 80 calculates the feature amount J based on the waveform component inherent to each of the pistons M1 to M9 separated from the pulsating waveform data by the separation part 7, the feature amount allowing the determination part 90 to determine a malfunction of the hydraulic pump 2 (Op 6). The feature amount J is calculated by, for example, the following formula that corresponds to the area of the square of the waveform component inherent to each of the pistons M1 to M9.

$$J = \int_0^{2\pi} (p_I(\varphi))^2 d\varphi = \pi \sum_{j=1}^{L} (\tilde{a}_j^2 + \tilde{b}_j^2)$$ [Formula 9]

When the feature amount J is calculated by the above formula, there is no need to use the waveform component common among the pistons M1 to M9 in the feature amount calculation. Therefore, the separation part 70 do not have to separate the waveform component common among the pistons M1 to M9 from the pulsating waveform data.

Alternatively, the feature amount J may be calculated by, for example, the following formula that corresponds to the ratio between the waveform component inherent to each of the pistons M1 to M9 and the waveform component common among the pistons M1 to M9. This feature amount J is a dimensionless number because it is obtained by dividing the numerator by the denominator to cancel the pressure unit. This makes it possible to eliminate the need to adjust the threshold value for the determination according to the discharge pressure of liquid in the hydraulic pump 2.

$$J = \frac{\sum_{j=1}^{L} (\tilde{a}_j^2 + \tilde{b}_j^2)}{\sum_{j=1}^{L} (\hat{a}_j^2 + \hat{b}_j^2)}$$ [Formula 10]

Alternatively, the feature amount J may be calculated by, for example, the following formula that corresponds to the ratio between the waveform component inherent to each of the pistons M1 to M9 and all the waveform components of the pulsating waveform data. This feature amount J is also a dimensionless number because it is obtained by dividing the numerator by the denominator to cancel the pressure unit. This makes it possible to eliminate the need to adjust the threshold value for the determination according to the discharge pressure of liquid in the hydraulic pump 2.

$$J = \frac{\sum_{j=1}^{L} (\tilde{a}_j^2 + \tilde{b}_j^2)}{\sum_{j=1}^{L} (a_j^2 + b_j^2)}$$ [Formula 11]

Alternatively, the feature amount J may be calculated by, for example, the following formula that corresponds to the maximum amplitude of an individual frequency of the waveform component inherent to each of the pistons M1 to M9.

$$J = \max_j \left( \sqrt{\tilde{a}_j^2 + \tilde{b}_j^2} \right)$$ [Formula 12]

Alternatively, the feature amount J may be calculated by, for example, the following formula that corresponds to the maximum amplitude of a pulsating waveform corresponding to a total of the waveform components inherent to the pistons M1 to M9.

$$J = \max |p_I(\varphi)|$$ [Formula 13]

It should be noted that the maximum amplitude calculated by the above formula may be substituted for by the maximum value among the absolute values obtained by applying Formula B for each of finely discrete rotation phases from 0 to $2\pi$, for example.

Further alternatively, the feature amount J may be calculated by, for example, the following formula that corresponds to the maximum of differential values of the waveform corresponding to the waveform components inherent to the pistons M1 to M9.

$$J = \max \left| \frac{d}{d\varphi} p_I(\varphi) \right|$$ [Formula 14]

A trouble of the pistons M1 to M9 such as looseness may occur as a result of a significant pressure change in the hydraulic fluid discharged from the hydraulic pump 2. The above formula is used to calculate the feature amount J by differentiating the function of Formula B with respect to the rotation phase. This makes it possible to accurately determine the presence/absence of a trouble of the pistons M1 to M9 such as looseness based on the feature amount J.

As described, the feature amount J may be calculated by any method, and can be appropriately changed according to the use mode of the malfunction diagnosing device X1. Therefore, the above-described various methods for calculating the feature amount J can be used in any combination, for example. Alternatively, the feature amount J may be calculated by a method other than the above-described various methods for calculating the feature amount J.

The feature amount calculation part 80 sends information about the calculated feature amount J to the determination section 90.

Figure 3:
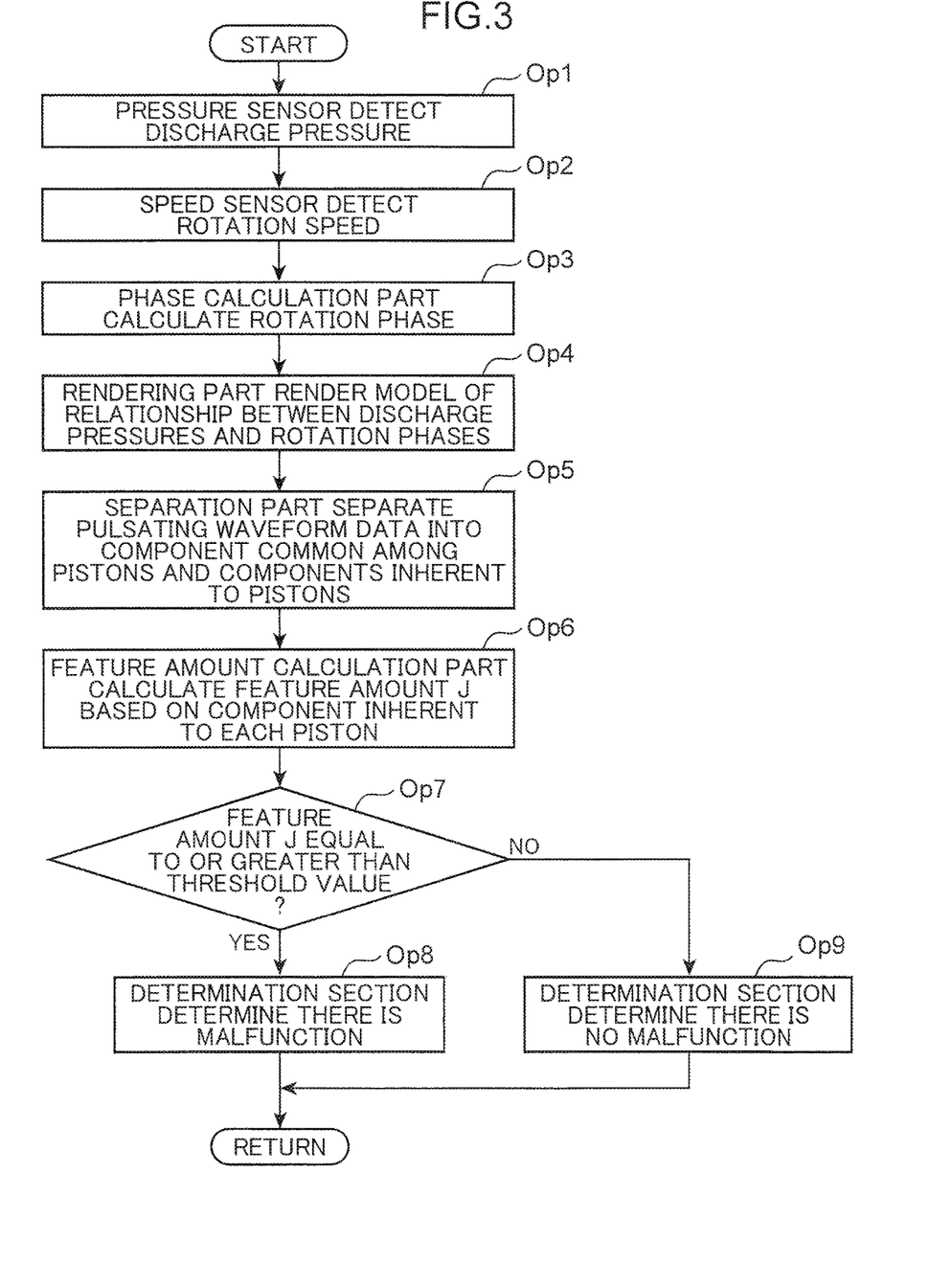
FIG. 3 is a flowchart showing the operation steps of the malfunction diagnosing device for a hydraulic pump according to the embodiment.

As shown in FIG. 3, the determination section 90 determines whether the feature amount J is equal to or greater than the threshold value stored in the determination section 90 based on the information about the feature amount J received from the feature amount calculation part 80 (Op7). In the case that the feature amount J is calculated based only on the waveform components inherent to the pistons M1 to M9, the determination section 90 determines the threshold value based on the average pressure value of hydraulic fluid discharged from the hydraulic pump 2, for example, and compares the determined threshold value with the feature amount J. In the case that the feature amount J is calculated based on the ratio between the waveform component inherent to each of the pistons M1 to M9 and the waveform component common among the pistons M1 to M9, the determination section 90 compares a fixed value determined in advance as the threshold value with the feature amount J.

When the determination section 90 determines that the feature amount J is equal to or greater than the threshold value (YES at Op7), the determination section 90 determines that there is a malfunction in the hydraulic pump 2 (Op8) and displays the determination result on a liquid crystal display, for example. When it is determined that the feature amount J is less than the threshold vale (NO at Op7), the determination section 90 determines that there is no malfunction in the hydraulic pump 2 (Op9) and displays the determination result on the liquid crystal display, for example. A user checks the presence/absence of a malfunction of the hydraulic pump 2 by referring to the determination result displayed on the liquid crystal display, for example.

The malfunction diagnosis of the hydraulic pump 2 by the malfunction diagnosing device X1 is completed in this manner.

As described above, the malfunction diagnosing device X1 is capable of diagnosing a malfunction of the hydraulic pump 2 without being affected by a change in the rotation speed of the hydraulic pump 2. Specifically, in the malfunction diagnosing device X1, pulsating waveform data for diagnosing a malfunction of the hydraulic pump 2 is obtained by rendering a model of a relationship between pressure values and rotation phases. Therefore, the pulsating waveform data allows, even when the rotation speed of the hydraulic pump 2 varies, an accurate diagnosis of a malfunction of the hydraulic pump without being affected by the variation.

Further, in the malfunction diagnosing device X1, pulsating waveform data is obtained by rendering a model of a relationship between pressure values and rotation phases, which can suppress the increase in the cost for the pressure sensor 30. Specifically, in the malfunction diagnosing device X1, even when the sampling interval of the pressure sensor 30 is set long, a relationship between pressure values and rotation phases can be obtained by repeatedly rotating the hydraulic pump 2 and superimposing sampling data for each rotation on one another. Therefore, there is no need to use a pressure sensor capable of detecting a pressure of liquid at a short sampling interval as the pressure sensor 30, which can suppress the cost increase.

Further, in the malfunction diagnosing device X1, the waveform components respectively inherent to the pistons are separated from the pulsating waveform data to allow a diagnosis of a malfunction of the hydraulic pump 2 based on the separated data, which allows a highly accurate diagnosis. Specifically, when the waveform component common among the pistons M1 to M9 is considerably greater than the waveform components respectively inherent to the pistons M1 to M9 in the pulsating waveform data, it is difficult to determine whether the waveform components respectively inherent to the pistons M1 to M9 appear in the pulsating waveform data. Accordingly, in the malfunction diagnosing device X1, the waveform components respectively inherent to the pistons M1 to M9 are separated from the pulsating waveform data and the separated data are used to diagnose a malfunction of the hydraulic pump 2, which allows a highly accurate diagnosis.

Further, in the malfunction diagnosing device X1, the determination section 90 determines whether the feature amount J related to the waveform component inherent to each of the pistons M1 to M9 calculated in the feature amount calculation part 80 exceeds a threshold value, which allows determination of the presence/absence of a malfunction of the hydraulic pump 2 based on the determination result.

Further, in the malfunction diagnosing device X1, the phase calculation part 50 calculates the rotation phase of the hydraulic pump 2 by multiplying an integrated value of rotation speeds of the hydraulic pump 2 by a predetermined correction factor, which allows accurate calculation of the rotation phase.

Further, in the malfunction diagnosing device X1, all the pressure pulsating waveform components not common among the pistons M1 to M9 are extracted, which allows detection of a trouble in any of the pistons M1 to M9 with high sensitivity.

Specifically, when a trouble occurs in one of the pistons M1 to M9, the influence appears in, not only the components of the pressure pulsating waveform of the rotation frequency, but also the components of the pressure pulsating waveforms of other frequencies. When only the components of the pressure pulsating waveform of the rotation frequency are extracted, no attention is paid to the influence in the components of the pressure pulsating waveforms of the other frequencies. This may lead to reduction in the detection sensitivity of a trouble in any of the pistons. Accordingly, in the malfunction diagnosing device X1, all the pressure pulsating waveform components not common among the pistons M1 to M9 are extracted to thereby allow detection of a trouble in any of the pistons M1 to M9 with high sensitivity.

Further, when it is tried to obtain the feature amount that changes once for each rotation, and if pistons disposed symmetric with respect to the rotation axis of the hydraulic pump 2 deteriorate at the same time, there is a possibility that a trouble in any of the pistons cannot be detected with high sensitivity. Accordingly, in the malfunction diagnosing device X1, all the pressure pulsating waveform components not common among the pistons M1 to M9 are extracted to thereby allow detection of a trouble in any of the pistons M1 to M9 with high sensitivity.

It is not necessary to extract all the pressure pulsating waveform components not common among the pistons M1 to M9. It is sufficient if almost all the pressure pulsating waveform components not in common among the pistons M1 to M9 are extracted to allow detection of a trouble in any of the pistons M1 to M9 with high sensitivity.

Further, in the malfunction diagnosing device X1, it is possible to detect a trouble in any of the pistons M1 to M9 without setting a threshold value in accordance with the pressure value of hydraulic fluid discharged by the hydraulic pump 2 by focusing the magnitude of the waveform component inherent to each of the pistons M1 to M9 with respect to the magnitude of the waveform component common among the pistons M1 to M9. In other words, the malfunction diagnosing device X1 can eliminate the work of adjusting the threshold value according to the pressure value of hydraulic fluid discharged by the hydraulic pump 2. Therefore, it is possible to diagnose the presence/absence of a malfunction of the hydraulic pump 2 easily.

Further, in the malfunction diagnosing device X1, it is possible to specify, based on the rendered pulsating waveform data or the data separated from the pulsating waveform data, one of the pistons M1 to M9 for which the corresponding waveform peak indicates an abnormality. This makes it possible to identify a piston actually having a trouble or to select some pistons that seem to actually have a trouble.

In the present embodiment, the presence/absence of a malfunction of the hydraulic pump 2 is determined based on a result of determination made by the determination part 90, but the determination part 80 may be omitted. In this case, the feature amount J calculated by the feature amount calculation part 80 is displayed on a display such as liquid crystal monitor, for example, to allow a user to determine the presence/absence of a malfunction of the hydraulic pump 2 by viewing the displayed feature amount J.

Further, in the present embodiment, the feature amount calculation part 80 calculates the feature amount J based on the waveform component inherent to each of the pistons M1 to M9 to allow determination of the presence/absence of a malfunction of the hydraulic pump 2 based on the feature amount J, but the feature amount calculation part 80 may be omitted. In this case, for example, the graph of FIG. 8 showing the waveform components respectively inherent to the pistons M1 to M9 is displayed on a display such as liquid crystal monitor to allow a user to determine the presence/absence of a malfunction of the hydraulic pump 2 by viewing the displayed graph of FIG. 8. At this time, for example, the graph of FIG. 7 showing the waveform component common among the pistons M1 to M9 may be displayed together with the graph of FIG. 8 on the display such as liquid crystal monitor. In this case, a user can find one of the nine peaks of the pulsating waveform in the graph of FIG. 7 that corresponds to a portion of the waveform indicating a great change in the graph of FIG. 8. This allows identification of one of the pistons M1 to M9 that is malfunctioning.

Further, in the present embodiment, the separation part 70 separates the waveform component common among the pistons M1 to M9 and the waveform components respectively inherent to the pistons M1 to M9 to determine the presence/absence of a malfunction of the hydraulic pump 2 based on the separated data, but the separation part 70 may be omitted. In this case, for example, the graph of FIG. 6 showing the pulsating waveform data is displayed on a display such as liquid crystal monitor to allow a user to determine the presence/absence of a malfunction of the hydraulic pump 2 by viewing the displayed graph of FIG. 6.

Alternatively, a waveform obtained by differentiating the graph of FIG. 6 with respect to the rotation phase or a waveform obtained by differentiating the graph of FIG. 8 with respect to the rotation phase may be displayed on a display such as liquid crystal monitor to allow a user to determine the presence/absence of a malfunction of the hydraulic pump 2 by viewing the displayed waveform. When differences are obtained from the graph of FIG. 5, the waveform is amplified by the influence of disturbance and noise, which makes the feature difficult to be found. Furthermore, the interval between adjacent data points is not constant, which makes the calculation of differences complex. Accordingly, in the present embodiment, a model of the graph of FIG. 5 is rendered and the function of the formula corresponding to the graphs of FIG. 8 and FIG. 9 after the rendering is differentiated, to make it possible to reliably obtain the feature amount related to a waveform irregularity by a simple calculation.

Further alternatively, it may be configured such that the feature amount calculation part 80 calculates the feature amount J based on the pulsating waveform data to allow the determination section 90 to determine the presence/absence of a malfunction of the hydraulic pump 2 by comparing the feature amount J and a threshold value. In this case, the feature amount calculation part 80 calculates the feature amount J by applying the following formula to the pulsating waveform data.

$$J = \max\left|\frac{d}{d\varphi}p(\varphi)\right| \quad \text{[Formula 15]}$$

Further, although the present embodiment has illustrated the malfunction diagnosing device X1 that diagnose a malfunction of the hydraulic pump 2 for discharging hydraulic fluid, the malfunction diagnosing device X1 can also diagnose a malfunction of a hydraulic pump for discharging liquid other than hydraulic fluid such as hot water.

It should be noted that the embodiment described above is exemplary in all respects and should not be regarded as restrictive. The scope of the present invention is indicated by the scope of the claims and not by the description given above, and includes all modifications within the same sense and scope as the claims.

The above-described embodiment includes the invention having the following configurations.

The present invention is a device for diagnosing a malfunction of a hydraulic pump that includes a plurality of pistons arranged in a circumferential direction and discharges liquid with rotation in the circumferential direction, comprising: a pressure detection section for detecting a pressure value of liquid discharged from the hydraulic pump in rotation; a rotation phase detection section for detecting a rotation phase of the hydraulic pump at the time when a pressure value of liquid is detected by the pressure detection section; and a rendering section for rendering a model of a relationship between pressure values of liquid detected by the pressure detection section and rotation phases of the hydraulic pump detected by the rotation phase detection section to thereby obtain pulsating waveform data.

The above-described device for diagnosing a malfunction of a hydraulic pump is capable of diagnosing a malfunction of the hydraulic pump without being affected by a change in the rotation speed of the hydraulic pump. Specifically, in the above-described device for diagnosing a malfunction of a hydraulic pump, pulsating waveform data for diagnosing a malfunction of the hydraulic pump is obtained by rendering a model of a relationship between pressure values and rotation phases. Therefore, the pulsating waveform data allows, even when the rotation speed of the hydraulic pump varies, an accurate diagnosis of a malfunction of the hydraulic pump without being affected by the variation.

It is preferred that the rendering section performs: superimposing detections for each rotation of the hydraulic pump on one another at specific phases to thereby obtain the relationship between pressure values of liquid detected by the pressure detection section and rotation phases of the hydraulic pump detected by the rotation phase detection section; mapping the obtained relationship in a space in which a frequency is defined with reference to one rotation of the hydraulic pump; and superimposing waveforms, the number of which is whole number times the frequency, the whole number being the number of rotations of the hydraulic pump, on one another to render the model of the relationship, thereby obtaining the pulsating waveform data.

When the pulsation frequency of the pressure of hydraulic fluid is analyzed along the time axis, the sampling interval at which the pressure detection section detects a pressure of hydraulic fluid needs to be set short enough to obtain a pulsating waveform of the pressure of hydraulic fluid along the time axis. This requires a pressure detection section capable of detecting a pressure of hydraulic fluid at a short sampling interval, which results in a high cost.

Accordingly, in the above-described device for diagnosing a malfunction of a hydraulic pump, pulsating waveform data is obtained by rendering a model of a relationship between pressure values and rotation phases, which can suppress the increase in the cost for the pressure detection section. Specifically, in the above-described device for diagnosing a malfunction of a hydraulic pump, even when the sampling interval of the pressure detection section is set long, a relationship between pressure values and rotation phases can be obtained by repeatedly rotating the hydraulic pump and superimposing sampling data for each rotation on one another. Therefore, there is no need to use a pressure detection section capable of detecting a pressure of liquid at a short sampling interval, which can suppress the cost increase.

It is preferred to further include a separation section for separating a component inherent to each piston from the pulsating waveform data rendered by the rendering section.

In the above-described device for diagnosing a malfunction of a hydraulic pump, the waveform components respectively inherent to the pistons are separated from the pulsating waveform data to allow a diagnosis of a malfunction of the hydraulic pump based on the separated data, which allows a highly accurate diagnosis. The pulsating waveform data is rendered by superimposing the waveform component common among the pistons on the waveform components respectively inherent to the pistons. The waveform components respectively inherent to the pistons appear when a malfunction occurs in any of the pistons. Here, when the waveform component common among the pistons is considerably greater than the waveform components respectively inherent to the pistons in the pulsating waveform data, it is difficult to determine whether the waveform components respectively inherent to the pistons appear in the pulsating waveform data. Accordingly, in the above-described device for diagnosing a malfunction of a hydraulic pump, the waveform components respectively inherent to the pistons are separated from the pulsating waveform data and the separated data are used to diagnose a malfunction of the hydraulic pump, which allows a highly accurate diagnosis.

It is preferred to further include a determination section for determining whether a feature amount related to the component inherent to each piston separated by the separation section exceeds a predetermined threshold value.

In the above-described device for diagnosing a malfunction of a hydraulic pump, whether the feature amount related to the waveform component inherent to each piston exceeds a threshold value is determined to allow determination of the presence/absence of a malfunction of the hydraulic pump based on the determination result.

The rotation phase detection section may be configured to multiply an integrated value obtained by adding up rotation speeds of the hydraulic pump by a predetermined correction factor to thereby calculate a rotation phase of the hydraulic pump at the time when a pressure value of liquid is detected by the pressure detection section.

In the above-described device for diagnosing a malfunction of a hydraulic pump, even when the rotation phase detection section does not directly detect a rotation phase of the hydraulic pump, the rotation phase detection section can accurately calculate the rotation phase of the hydraulic pump by multiplying an integrated value of rotation speeds of the hydraulic pump by a predetermined correction factor.

The invention claimed is:

1. A device for diagnosing a malfunction of a hydraulic pump that is provided on a hydraulic circuit having an oil tank and a hydraulic pump, and is driven by a driving source to transfer liquid from the oil tank to the hydraulic cylinder, and includes a plurality of pistons arranged in a circumferential direction and discharges liquid with rotation of the plurality of pistons in the circumferential direction, comprising:
   a pressure detection section provided between the hydraulic pump and the hydraulic cylinder for detecting a pressure value of liquid discharged from the hydraulic pump in rotation;
   a rotation phase detection section for detecting a rotation phase of the plurality of pistons of the hydraulic pump at the time when a pressure value of liquid is detected by the pressure detection section, the rotation phase detection section having a sensor provided to the hydraulic pump; and
   a rendering section connected with the pressure detection section and the rotation phase detection section for rendering a model of a relationship between pressure values of liquid detected by the pressure detection section and rotation phases of the hydraulic pump detected by the rotation phase detection section to thereby obtain pulsating waveform data eliminating a variation in the rotation of the hydraulic pump.

2. The device for diagnosing a malfunction of a hydraulic pump according to claim 1, wherein the rendering section performs: superimposing detections for each rotation of the hydraulic pump on one another at specific phases to thereby obtain a relationship between pressure values of liquid detected by the pressure detection section and rotation phases of the hydraulic pump detected by the rotation phase detection section; mapping the obtained relationship in a space in which a frequency is defined with reference to one rotation of the hydraulic pump; and superimposing waveforms, a number of which is a whole number times the frequency, the whole number being the number of rotations of the hydraulic pump, on one another to render the model of the relationship, thereby obtaining the pulsating waveform data.

3. The device for diagnosing a malfunction of a hydraulic pump according to claim 1, further comprising a separation section connected with the rendering section for separating a component inherent to each piston from the pulsating waveform data rendered by the rendering section.

4. The device for diagnosing a malfunction of a hydraulic pump according to claim 3, further comprising a determination section connected with the separation section for determining whether a feature amount related to the component inherent to each piston separated by the separation section exceeds a predetermined threshold value.

5. The device for diagnosing a malfunction of a hydraulic pump according to claim 1, wherein the rotation phase detection section multiplies an integrated value obtained by adding up rotation speeds of the hydraulic pump by a predetermined correction factor to thereby calculate a rotation phase of the hydraulic pump at the time when a pressure value of liquid is detected by the pressure detection section.

\* \* \* \* \*